US011680886B2

(12) United States Patent
Agarwal et al.

(10) Patent No.: US 11,680,886 B2
(45) Date of Patent: Jun. 20, 2023

(54) APPARATUS AND ASSOCIATED METHODS FOR DETECTING AIR-BORNE PARTICLES

(71) Applicant: Nokia Technologies Oy, Espoo (FI)

(72) Inventors: Akshat Agarwal, Clonmagadden (IE); Nicholas Jeffers, Wicklow (IE)

(73) Assignee: Nokia Technologies Oy, Espoo (FI)

( * ) Notice: Subject to any disclaimer, the term of this patent is extended or adjusted under 35 U.S.C. 154(b) by 129 days.

(21) Appl. No.: 16/767,835

(22) PCT Filed: Dec. 10, 2018

(86) PCT No.: PCT/FI2018/050890
§ 371 (c)(1),
(2) Date: May 28, 2020

(87) PCT Pub. No.: WO2019/115868
PCT Pub. Date: Jun. 20, 2019

(65) Prior Publication Data
US 2020/0378880 A1    Dec. 3, 2020

(30) Foreign Application Priority Data

Dec. 15, 2017   (EP) ..................... 17207631

(51) Int. Cl.
*G01N 15/06* (2006.01)
*G01N 15/12* (2006.01)
*G01N 15/00* (2006.01)

(52) U.S. Cl.
CPC ..... *G01N 15/0656* (2013.01); *G01N 15/1218* (2013.01); *G01N 2015/0046* (2013.01)

(58) Field of Classification Search
CPC .......... G01N 15/0656; G01N 15/1218; G01N 2015/0046; G01N 15/1209
See application file for complete search history.

(56) References Cited

U.S. PATENT DOCUMENTS

| 3,502,974 A * | 3/1970 | Coulter ................. G01N 15/12 324/71.1 |
| 5,247,827 A | 9/1993 | Shah |
| 7,038,460 B1 | 5/2006 | Skinner |
| 8,950,239 B2 | 2/2015 | Kuczynski et al. |

(Continued)

FOREIGN PATENT DOCUMENTS

EP    3171038 A1    5/2017

OTHER PUBLICATIONS

Skinner et al., "Electrostatic Dust Detection and Removal for ITER", Princeton Plasma Physics Laboratory, PPPL-4351, Sep. 2008, 12 pages.

(Continued)

*Primary Examiner* — David Z Huang
(74) *Attorney, Agent, or Firm* — Harrington & Smith

(57) ABSTRACT

An apparatus comprising: a body having an aperture dimensioned to receive an air-borne particle of corresponding size; first and second electrodes positioned within the aperture between which a potential difference can be applied; and a measurement circuit configured to measure an electrical property between the first and second electrodes such that the presence of the air-borne particle within the aperture can be detected based on a change in the electrical property when the air-borne particle contacts both the first and second electrodes.

20 Claims, 5 Drawing Sheets

(56) References Cited

U.S. PATENT DOCUMENTS

| | | |
|---|---|---|
| 2003/0113833 A1 | 6/2003 | Oka et al. |
| 2004/0152067 A1* | 8/2004 | Wang ............... G01N 33/48728 |
| | | 435/287.1 |
| 2004/0197898 A1* | 10/2004 | Nakatani .......... G01N 33/48728 |
| | | 435/287.1 |
| 2005/0279634 A1 | 12/2005 | Ozaki et al. |
| 2007/0044579 A1* | 3/2007 | Yamaguchi ........ G01N 15/1056 |
| | | 73/865.5 |
| 2012/0312074 A1 | 12/2012 | Allmendinger et al. |
| 2017/0074148 A1 | 3/2017 | Zhang |
| 2017/0234822 A1 | 8/2017 | Ruhi et al. |
| 2019/0178775 A1* | 6/2019 | Feng ...................... G01N 27/62 |

OTHER PUBLICATIONS

Wattieaux et al., "Discharge Impedance Evolution, Stray Capacitance Effect, and Correlation with the Particles Size in a Dusty Plasma", Physics of Plasma, vol. 19, 2012, pp. 033701-1-033701-8.

Extended European Search Report received for corresponding European Patent Application No. 17207631.7, dated Jun. 6, 2018, 10 pages.

International Search Report and Written Opinion received for corresponding Patent Cooperation Treaty Application No. PCT/FI2018/050890, dated Feb. 12, 2019, 13 pages.

Office action received for corresponding European Patent Application No. 17207631.7, dated Jan. 27, 2020, 10 pages.

Office action received for corresponding European Patent Application No. 17207631.7, dated Nov. 26, 2020, 7 pages.

\* cited by examiner

615 — Form body having aperture dimensioned to receive air-borne particle of corresponding size 616 — Position first and second electrodes within aperture 617 — Configure measurement circuit to measure electrical property between first and second electrodes

APPARATUS AND ASSOCIATED METHODS FOR DETECTING AIR-BORNE PARTICLES

RELATED APPLICATION

This application claims priority to PCT Application No. PCT/FI2018/050890, filed on Dec. 10, 2018, which claims priority to European Application No. 17207631.7, filed on Dec. 15, 2017, each of which is incorporated herein by reference in its entirety.

TECHNICAL FIELD

The present disclosure relates particularly to air-borne particle detectors, associated methods and apparatus. Certain embodiments specifically concern an apparatus comprising a body having an aperture dimensioned to receive an air-borne particle of corresponding size, first and second electrodes positioned within the aperture between which a potential difference can be applied, and a measurement circuit configured to measure an electrical property between the first and second electrodes. In these embodiments, the presence of an air-borne particle within the aperture can be detected based on a change in the electrical property when the air-borne particle contacts both the first and second electrodes.

Some embodiments may relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs. The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop sensors for detecting particulate matter in the air.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising:
 a body having an aperture dimensioned to receive an air-borne particle of corresponding size;
 first and second electrodes positioned within the aperture between which a potential difference can be applied; and
 a measurement circuit configured to measure an electrical property between the first and second electrodes such that the presence of the air-borne particle within the aperture can be detected based on a change in the electrical property when the air-borne particle contacts both the first and second electrodes.

The body may comprise a panel of material (such as an electrically insulating material).

The body may be a printed circuit board.

The electrical property may comprise one or more of current, resistance, conductivity, resistivity and capacitance.

The body may comprise a plurality of apertures dimensioned to receive respective air-borne particles of corresponding size, each aperture having a respective pair of first and second electrodes positioned therein, and the measurement circuit may be configured to measure an electrical property between the first and second electrodes of each aperture to enable the presence of the respective air-borne particles to be detected.

Each aperture may be dimensioned to receive a respective air-borne particle of the same size or a different size.

The apparatus may comprise a processor configured to detect the presence of the air-borne particle based on the change in the electrical property.

The processor may be configured to determine the composition of the air-borne particle based on the magnitude of the electrical property measured when the air-borne particle contacts both the first and second electrodes.

The first and second electrodes may be opposingly positioned within the aperture.

The first and second electrodes may together extend substantially around the circumference of the aperture.

Each of the first and second electrodes may comprise a plurality of electrode portions positioned at different points around the circumference of the aperture.

The apparatus may be configured to direct air-borne particles through the aperture.

The apparatus may comprise an actuator connected to the body, and the actuator may be configured to oscillate the body such that air-borne particles are directed through the aperture.

The apparatus may comprise an oscillating beam or diaphragm, and the body may be positioned adjacent to the oscillating beam or diaphragm such that movement of the oscillating beam or diaphragm directs air-borne particles through the aperture.

The apparatus may be configured to enable oscillation at both resonance and off-resonance frequencies.

The apparatus may be one or more of an electronic device, a portable electronic device, a portable telecommunications device, a mobile phone, a personal digital assistant, a tablet, a phablet, a desktop computer, a laptop computer, a server, a smartphone, a smartwatch, smart eyewear, a sensor, a circuit board, and a module for one or more of the same.

According to a further aspect, there is provided a method of making an apparatus, the method comprising:
 forming a body having an aperture dimensioned to receive an air-borne particle of corresponding size;
 positioning first and second electrodes within the aperture between which a potential difference can be applied; and
 configuring a measurement circuit to measure an electrical property between the first and second electrodes such that the presence of the air-borne particle within the aperture can be detected based on a change in the electrical property when the air-borne particle contacts both the first and second electrodes.

According to a further aspect, there is provided a method of using an apparatus, the apparatus comprising a body having an aperture dimensioned to receive an air-borne particle of corresponding size, first and second electrodes positioned within the aperture between which a potential difference can be applied, and a measurement circuit configured to measure an electrical property between the first and second electrodes such that the presence of the air-borne particle within the aperture can be detected based on a change in the electrical property when the air-borne particle contacts both the first and second electrodes, the method comprising detecting the presence of an air-borne particle within the aperture based on a change in the electrical property when the air-borne particle contacts both the first and second electrodes.

The steps of any method disclosed herein do not have to be performed in the exact order disclosed, unless explicitly stated or understood by the skilled person.

Corresponding computer programs for implementing one or more steps of the methods disclosed herein are also within the present disclosure and are encompassed by one or more of the described example embodiments.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable medium, which may be a physical computer readable medium such as a disc or a memory device, or may be embodied as a transient signal. Such a transient signal may be a network download, including an internet download.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 5 shows another example of the present apparatus;

FIG. 6 shows a method of making the present apparatus;

DESCRIPTION OF SPECIFIC ASPECTS/EMBODIMENTS

Rapid industrialization around the world has brought with it increasing air pollution. This form of pollution consists of air-borne particles which mix with the atmosphere upon emission and remain suspended in the air. In addition to affecting the immediate surroundings, such particles can be carried over long distances by winds, having an impact over a large area.

Such particles can vary in size, with the smaller particles capable of entering and being deposited in the human respiratory system. This phenomenon has led to an increase in mortality in heavily polluted areas and is a public health issue that most large cities are dealing with.

Studies have found a correlation between outdoor and indoor particulate matter which is a cause for concern at locations such as hospitals which have to be kept free of such particles.

An important aspect of dealing with air pollution is the detection of particulate matter in the air. In the outdoor environment, effective monitoring can help to clamp down on offenders and advise the public on necessary precautions. In the indoor environment, monitoring can help to identify precise areas which require purification of air.

Most dust sensors available commercially are based on optical sensing of the dust particles. The unit typically consists of an infra-red light emitting diode (LED) pointed at the dust particles which scatter the light towards a photodiode (photometry). The signal from the photodiode is then processed to identify the number and size of dust particles detected. The particles are sized according to the PM2.5 and PM10 groups.

Dust particles can be driven towards the sensor either by natural or forced convection. Forced convection can be brought about by a fan which directs air towards the sensor. The alternative approach is using a passive heat source, typically a joule-heated resistor, which causes thermal convection that transports particles to the detection zone.

A major drawback of such sensors is the sensitivity of the photodiode signal to the ambient conditions. For example, even with particles of identical size, different compositions of dust can result in different light-scattering patterns. This results in erroneous measurements of particle size, and the photodiode has to be tuned accordingly.

Another drawback is the space required for the entire photometry system. The light source, photodetector, associated lenses, and air moving device require a large volume that makes the system bulky. This limits the range of deployment opportunities for such sensors and affects their accuracy if not tuned.

Furthermore, sensors with joule-heated resistors typically have a slow response time as the element heats up. In time-critical environments such as hospitals, the delay that such a sensor would introduce might be unacceptable.

There will now be described an apparatus and associated methods that may address the above-mentioned issues.

Figure 1A:
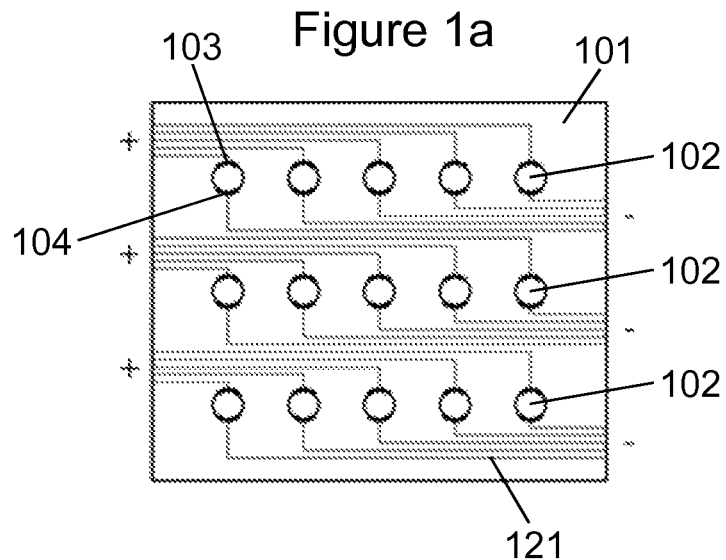
FIG. 1a shows one example of the present apparatus in plan-view.
Figure 1B:
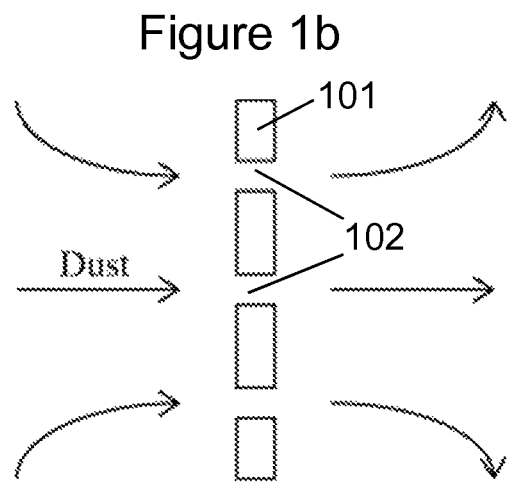
FIG. 1b shows the apparatus of FIG. 1a in cross-section.

FIGS. 1a and 1b show one example of the present apparatus in plan-view and cross-section, respectively. The apparatus comprises a body 101 having a plurality of apertures 102 (although it could comprise a single aperture 102) dimensioned to receive respective air-borne particles of corresponding size, each aperture 102 having a respective pair of first 103 and second 104 electrodes positioned therein between which a potential difference can be applied, and a measurement circuit (not shown) configured to measure an electrical property between the first 103 and second 104 electrodes of each aperture 102.

In this example, the body 101 is formed from an electrically insulating material having a planar structure and uniform thickness, and comprises electrically conductive traces 121 extending from the first 103 and second 104 electrodes to enable the application of a potential difference therebetween. In general, however, the body 101 may have a variety of different form factors and may comprise a range of different materials. For example, the body 101 may have a planar or non-planar structure with a uniform or non-uniform thickness.

Figure 1C:
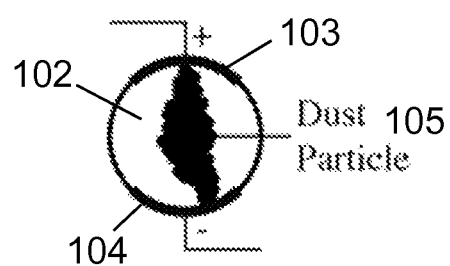
FIG. 1c shows greater detail of an aperture of the apparatus of FIGS. 1a and 1b.

FIG. 1c shows greater detail of an aperture 102 of FIGS. 1a and 1b. When an air-borne particle 105 of corresponding size is received by the aperture 102, it contacts both the first 103 and second 104 electrodes. Assuming the electrical properties of the particle 105 are different from those of the air, this causes a change in the electrical property between the electrodes 103, 104 allowing the presence of the air-borne particle 105 to be detected. The detected particle 105 may then remain in the aperture 102 (e.g. the apparatus also acting as a particle filter) or it may pass through the aperture 102. In contrast, larger particles will not be received by the aperture 102 and received smaller particles will bypass the electrodes 103, 104 as they pass through the aperture 102. These particles are not detected by the apparatus.

The present apparatus is therefore capable of detecting air-borne particles 105 of a particular size depending on the dimensions of the apertures 102 (and possibly depending on the spacing of the first 103 and second 104 electrodes positioned therein). This enables a more accurate measurement of particle size without the need to tune the measurement circuit. Furthermore, the absence of optics required by existing optical sensors allows the present apparatus to be less expensive, more compact and more versatile.

The air-borne particles 105 detected by the present apparatus may comprise one or more of dust, dirt, soot, smoke, and other organic or inorganic materials. Furthermore, the average particle size (and therefore the diameter of the apertures 102 and/or spacing of the first 103 and second 104 electrodes) may be up to 100 µm, such as between 100 nm and 50 µm. In addition, the apertures 102 of the body 101 may be through holes (i.e. extending completely through the thickness of the body 101) or blind holes (i.e. extending partially through the thickness of the body 101). In the latter scenario, the body 101 may be used to collect the detected air-borne particles 105 for subsequent removal.

In examples with multiple apertures 102, the apertures 102 may be dimensioned (and/or the first 103 and second 104 electrodes may be spaced) to receive respective air-borne particles 105 of one or more of the same size and different sizes. The use of multiple apertures 102 increases the chance of detecting the particles 105 and provides a more quantitative measurement of the number or concentration of particles 105 in the vicinity of the apparatus. Furthermore, the use of different sized apertures 102 and/or different electrode 103, 104 spacings allows the size distribution of the particles 105 to be determined. Similarly, the apertures 102 may have the same shape, or they may have different shapes to allow the shape distribution of the particles 105 to be determined.

In some examples, the apparatus may comprise a processor configured to detect the presence of the air-borne particles 105 based on the change in the electrical property. In these examples, the processor may be further configured to determine the composition of the air-borne particles 105 based on the magnitude of the electrical property measured when the air-borne particles 105 contact both the first 103 and second 104 electrodes. This is because different compositions of particle 105 typically exhibit different electrical properties. The composition may be determined in practice by comparing the measured electrical property with predetermined calibration data (e.g. composition vs measurement of electrical property).

The electrical property being measured may comprise one or more of current, resistance, conductivity, resistivity and capacitance. For example, the measurement circuit may be configured to measure the current between the first 103 and second 104 electrodes. Additionally or alternatively, the resistance could be determined from the applied voltage and measured current. If desired, the conductivity or resistivity could then be calculated using the determined resistance together with an estimation of the particle 105 dimensions (e.g. using the depth and area of the corresponding aperture 102).

The presence of an air-borne particle 105 in one of the apertures 102 is likely to cause an increase (decrease) in the current (resistance) flowing between the first 103 and second 104 electrodes since the conductivity of most compositions of particle 105 is greater than air. This may depend on the relative humidity, however, as suspended water droplets could increase the conductivity of the air.

Figure 2A:
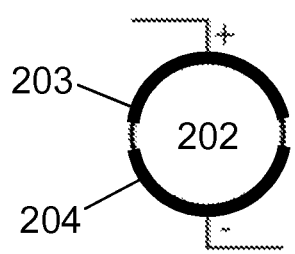
FIG. 2a shows one example of the first and second electrodes within an aperture of the present apparatus.
Figure 2B:
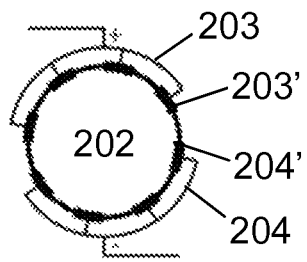
FIG. 2b shows another example of the first and second electrodes within an aperture of the present apparatus.

FIGS. 2a and 2b show different configurations of the first 203 and second 204 electrodes within an aperture 202 of the present apparatus. In practice, the first 203 and second 204 electrodes would normally be opposingly positioned within the aperture 202 to increase the chance of the air-borne particle contacting both electrodes 203, 204 when it is received by the aperture 202. In order to further increase the likelihood of this, however, the first 203 and second 204 electrodes may together extend substantially around the circumference of the aperture 202 (as illustrated in FIG. 2a). Alternatively, each of the first 203 and second 204 electrodes may comprise a plurality of electrode portions 203', 204' positioned at different points around the circumference of the aperture 202 (as illustrated in FIG. 2b).

The present apparatus may be carefully positioned to help ensure that any correspondingly sized air-borne particles in the environment enter the apertures of the body. In some examples, however, the apparatus may be configured to direct air-borne particles through the apertures (i.e. using forced convection rather than relying on natural convection). This can be achieved in a number of different ways.

Figure 3A:
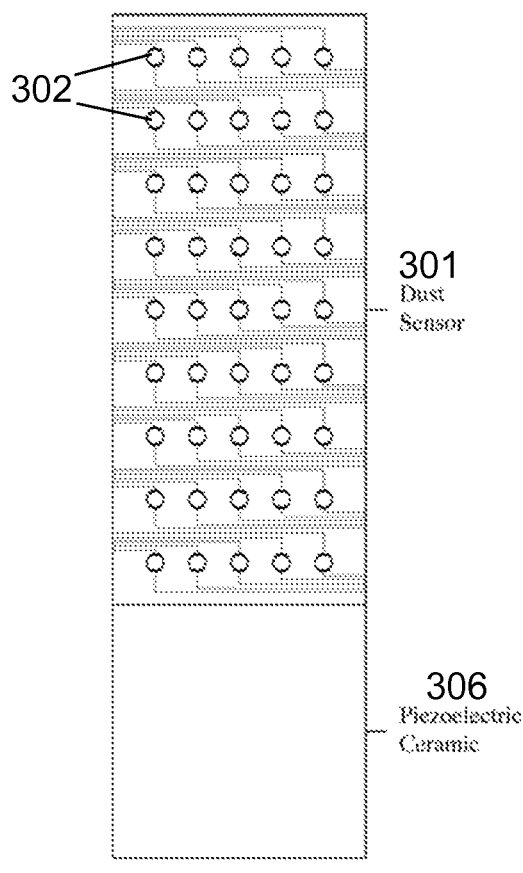
FIG. 3a shows another example of the present apparatus in plan-view.
Figure 3B:
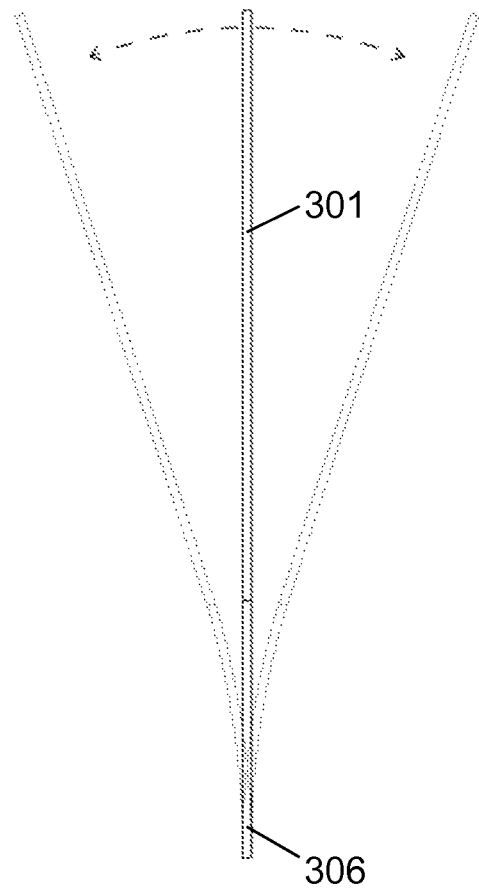
FIG. 3b shows the apparatus of FIG. 3a in cross-section.

FIGS. 3a and 3b show, in plan-view and cross-section respectively, one example of the present apparatus which uses forced convection. In this example, the apparatus comprises a piezoelectric ceramic actuator 306 connected to the body 301 (although other types of actuator could be used instead). The actuator 306 is configured to oscillate the body 301 such that air-borne particles are directed through the apertures 302. Oscillation of the body 301 by the actuator 306 also allows the apparatus to function as a fan for cooling purposes or to blow away the air-borne particles. These functions may be particularly useful if the apparatus is incorporated into the housing of an electronic device where it can be used to cool electronic components and/or prevent dust particles from settling on the device circuitry and causing short circuits or electrical fires.

Figure 4A:
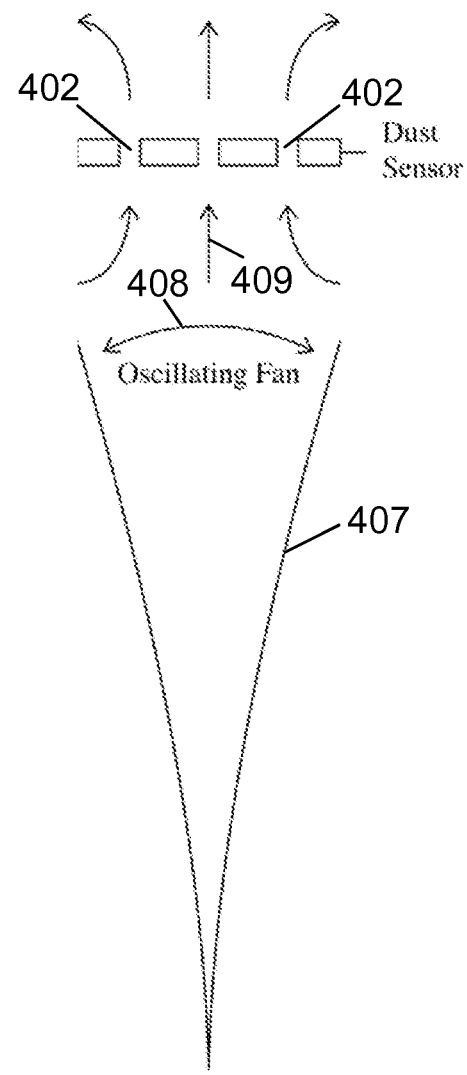
FIG. 4a shows another example of the present apparatus in cross-section.
Figure 4B:
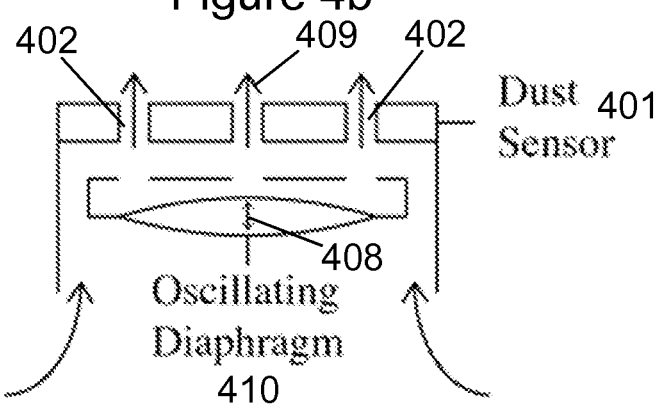
FIG. 4b shows another example of the present apparatus in cross-section.

FIGS. 4a and 4b show cross-sections of other examples of the present apparatus which use forced convection. In the example of FIG. 4a, the apparatus comprises an oscillating beam 407, and the body 401 is positioned adjacent to the oscillating beam 407 such that movement 408 of the oscillating beam 407 directs air-borne particles through the apertures 402. Here, the axis of oscillation 408 is substantially perpendicular to the direction 409 of air flow (i.e. transverse oscillation). In the example of FIG. 4b, the oscillating beam 407 is replaced with an oscillating diaphragm 410 which moves 408 substantially parallel to the direction 409 of air flow (i.e. longitudinal oscillation).

Each of the examples shown in FIGS. 3a, 3b, 4a and 4b typically exhibit a shorter response time than sensors with joule-heated resistors which require the heating element to reach an operational temperature before it can cause thermal convection.

Over time, the apertures 402 of the body 401 may become blocked with air-borne particles which can inhibit continued detection. In order to address this issue, the apparatus may be configured to oscillate at a frequency which causes the trapped particles to become dislodged. In this respect, it has been found that oscillation at the resonance frequency results in regular periodic motion which is suitable for detection (i.e. a "sensing mode"), whilst oscillation at off-resonance frequencies results irregular motion which is suitable for cleaning (i.e. a "cleaning mode"). To provide both sensing and cleaning modes, therefore, the present apparatus may be configured to enable oscillation at both resonance and off-resonance frequencies.

FIG. 5 shows another example of the present apparatus. The apparatus may be one or more of an electronic device, a portable electronic device, a portable telecommunications device, a mobile phone, a personal digital assistant, a tablet, a phablet, a desktop computer, a laptop computer, a server, a smartphone, a smartwatch, smart eyewear, a circuit board, and a module for one or more of the same.

The apparatus comprises the body 501, electrodes 503, 504 and measurement circuit 510 described previously, a processor 511, a storage medium 512 and a power supply 513, which are electrically connected to one another by a data bus 514. In this example, the measurement circuit 510 comprises an ammeter, but it may additionally or alternatively comprise an ohmmeter, capacitance meter, voltmeter or multimeter.

The processor 511 is configured for general operation of the apparatus by providing signalling to, and receiving signalling from, the other components to manage their operation; the storage medium 512 is configured to store computer code configured to perform, control or enable operation of the apparatus; and the power supply 513 is configured to provide electrical power to each of the components to enable their operation.

The storage medium 512 may also be configured to store settings for the other components. The processor 511 may access the storage medium 512 to retrieve the component settings in order to manage the operation of the other components. Furthermore, the processor 511 may be configured to detect the presence of the air-borne particle based on the change in the electrical property, and may also be configured to determine the composition of the air-borne particle based on the magnitude of the electrical property measured when the air-borne particle contacts both the first 503 and second 504 electrodes. In the latter scenario, the storage medium 512 may be configured to store predetermined calibration data (e.g. composition vs measurement of electrical property) to enable determination of the particle composition.

The processor 511 may be a microprocessor, including an Application Specific Integrated Circuit (ASIC). The storage medium 512 may be a temporary storage medium such as a volatile random access memory. On the other hand, the storage medium 512 may be a permanent storage medium such as a hard disk drive, a flash memory, or a non-volatile random access memory. The power supply 513 may comprise one or more of a mains supply, a primary battery, a secondary battery, a capacitor, a supercapacitor and a battery-capacitor hybrid.

FIG. 6 shows the main steps 615-617 of a method of making the present apparatus. The method generally comprises: forming a body having an aperture dimensioned to receive an air-borne particle of corresponding size 615 (e.g. by moulding or 3D printing the body with aperture, or by drilling or etching an existing body without aperture); positioning first and second electrodes within the aperture between which a potential difference can be applied 616 (e.g. by forming electrodes on, or attaching preformed electrodes to, the internal wall(s) of the aperture); and configuring a measurement circuit to measure an electrical property between the first and second electrodes such that the presence of the air-borne particle within the aperture can be detected based on a change in the electrical property when the air-borne particle contacts both the first and second electrodes 617.

Figure 7:
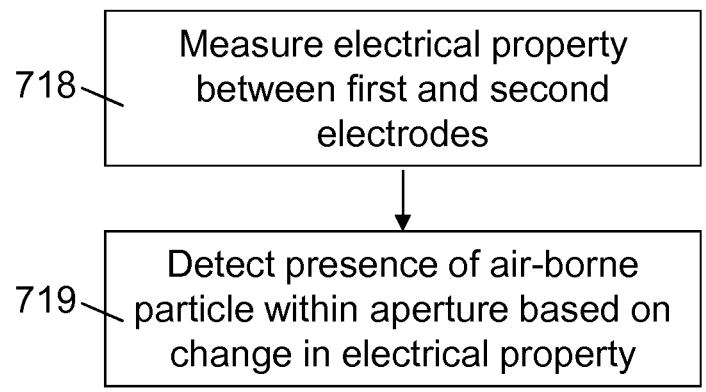
FIG. 7 shows a method of using the present apparatus.

FIG. 7 shows the main steps 718-719 of a method of using the present apparatus. The method generally comprises: measuring an electrical property between the first and second electrodes 718; and detecting the presence of an air-borne particle within an aperture based on a change in the electrical property when the air-borne particle contacts both the first and second electrodes 719.

Figure 8:
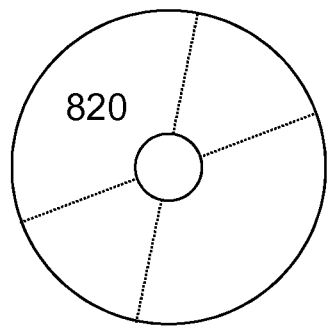
FIG. 8 shows a computer-readable medium comprising a computer program configured to perform, control or enable a method described herein.

FIG. 8 illustrates schematically a computer/processor readable medium 820 providing a computer program according to one embodiment. The computer program may comprise computer code configured to perform, control or enable one or more of the method steps 615-617 of FIG. 6 using existing manufacturing/assembling equipment. Additionally or alternatively, the computer program may comprise computer code configured to perform, control or enable one or more of the method steps 718-719 of FIG. 7 using at least part of the apparatus described herein. In this example, the computer/processor readable medium 820 is a disc such as a digital versatile disc (DVD) or a compact disc (CD). In other embodiments, the computer/processor readable medium 820 may be any medium that has been programmed in such a way as to carry out an inventive function. The computer/processor readable medium 820 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a body having an aperture dimensioned to receive a first air-borne particle of a size corresponding to the aperture therethrough and further dimensioned to not receive a second air-borne particle of a size greater than the size corresponding to the aperture therethrough;
first and second electrodes not in contact with each other and positioned on or within one or more walls defining the aperture between which a potential difference can be applied, wherein each of the first and second electrodes does not extend across the aperture, and wherein each of the first and second electrodes is not extended off a surface defining the one or more walls; and
a measurement circuit configured to measure an electrical property between the first and second electrodes such that the presence of the first air-borne particle within the aperture can be detected based on a change in the electrical property when the first air-borne particle contacts both the first and second electrodes and such that the second air-borne particle is prevented from contacting both the first and second electrodes.

2. The apparatus of claim 1, wherein the electrical property comprises one or more of current, resistance, conductivity, resistivity and capacitance.

3. The apparatus of claim 1, wherein the body comprises a plurality of apertures dimensioned to receive respective air-borne particles of corresponding size, each aperture having a respective pair of first and second electrodes positioned therein, and wherein the measurement circuit is configured to measure an electrical property between the first and second electrodes of each aperture to enable the presence of the respective air-borne particles to be detected.

4. The apparatus of claim 3, wherein each aperture is dimensioned to receive a respective air-borne particle of a different size.

5. The apparatus of claim 1, wherein the apparatus comprises a processor configured to detect the presence of the first air-borne particle based on the change in the electrical property.

6. The apparatus of claim 5, wherein the processor is configured to determine the composition of the first air-borne particle based on the magnitude of the electrical property measured when the first air-borne particle contacts both the first and second electrodes.

7. The apparatus of claim 1, wherein the first and second electrodes are opposingly positioned within the aperture.

8. The apparatus of claim 1, wherein the first and second electrodes together extend substantially around the circumference of the aperture.

9. The apparatus of claim 1, wherein each of the first and second electrodes comprise a plurality of electrode portions positioned at different points around the circumference of the aperture.

10. The apparatus of claim 1, wherein the apparatus is configured to direct at least the first air-borne particles through the aperture.

11. The apparatus of claim 10, wherein the apparatus comprises an actuator connected to the body, and wherein the actuator is configured to oscillate the body such that at least the first air-borne particles are directed through the aperture.

12. The apparatus of claim 10, wherein the apparatus comprises an oscillating beam or diaphragm, and wherein the body is positioned adjacent to the oscillating beam or diaphragm such that movement of the oscillating beam or diaphragm directs at least the first air-borne particles through the aperture.

13. The apparatus of claim 11, wherein the apparatus is configured to enable oscillation at both resonance and off-resonance frequencies.

14. A method of making an apparatus, the method comprising:

forming a body having an aperture dimensioned to receive a first air-borne particle of a size corresponding to the aperture therethrough and further dimensioned to not receive a second air-borne particle of a size greater than the size corresponding to the aperture;

positioning first and second electrodes not in contact with each other and on or within one or more walls defining the aperture between which a potential difference can be applied, wherein each of the first and second electrodes does not extend across the aperture, and wherein each of the first and second electrodes is not extended off a surface defining the one or more walls; and configuring a measurement circuit to measure an electrical property between the first and second electrodes such that the presence of the first air-borne particle within the aperture can be detected based on a change in the electrical property when the first air-borne particle contacts both the first and second electrodes.

15. The method of claim 14, wherein configuring a measurement circuit comprises configuring a measurement circuit to measure resistance between the first and second electrodes.

16. The method of claim 14, wherein the method further comprises configuring a processor to detect the presence of the first air-borne particle based on the change in the electrical property.

17. The method of claim 16, wherein the configuring a processor comprises determining the composition of the first air-borne particle based on the magnitude of the electrical property measured when the first air-borne particle contacts both the first and second electrodes.

18. The method of claim 14, wherein the method further comprises positioning the first and second electrodes opposingly within the aperture.

19. The method of claim 14, wherein the method further comprises extending the first and second electrodes together substantially around the circumference of the aperture.

20. The method of claim 14, wherein the method further comprises positioning a plurality of electrode portions, of the first and second electrodes, at different points around the circumference of the aperture.

* * * * *